United States Patent
Krishnaiyer et al.

(10) Patent No.: US 7,991,746 B2
(45) Date of Patent: Aug. 2, 2011

(54) STORAGE SYSTEM AND METHOD

(75) Inventors: Rajesh Anantha Krishnaiyer, Bangalore (IN); Subramaniam Venkata Kalambur, Bangalore (IN); Puneet Puri, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 512 days.

(21) Appl. No.: 12/099,696

(22) Filed: Apr. 8, 2008

(65) Prior Publication Data

US 2008/0263113 A1 Oct. 23, 2008

(30) Foreign Application Priority Data

Apr. 9, 2007 (IN) ................ 743/CHE/2007

(51) Int. Cl.
*G06F 7/00* (2006.01)
*G06F 17/30* (2006.01)

(52) U.S. Cl. ............. 707/664; 707/692; 711/162

(58) Field of Classification Search .......... 707/600–831; 711/161, 162, 209; 713/190, 191; 709/214–216, 709/223–229
See application file for complete search history.

(56) References Cited

U.S. PATENT DOCUMENTS

| | | | |
|---|---|---|---|
| 6,449,688 B1 * | 9/2002 | Peters et al. | 711/112 |
| 6,865,598 B2 | 3/2005 | Watkins et al. | |
| 6,886,032 B2 | 4/2005 | Watkins et al. | |
| 2003/0033308 A1 * | 2/2003 | Patel et al. | 707/10 |
| 2003/0115206 A1 * | 6/2003 | Gilbert | 707/100 |
| 2003/0187825 A1 * | 10/2003 | Tabata | 707/1 |
| 2008/0126357 A1 * | 5/2008 | Casanova et al. | 707/10 |

OTHER PUBLICATIONS

Junkil Ryu et al., Controlling Network Bandwidth to Support Storage QoS, Sep. 24-24, 2007, IEEE, 8 pages.*
Qun Liu et al., A framework for accessing general object storage, Aug. 14, 2006, IEEE, 4 pages.*

* cited by examiner

*Primary Examiner* — Jean B Fleurantin

(57) ABSTRACT

A storage system comprising apparatus for consolidating portions of free space from a plurality of remote storage units; and apparatus for presenting the consolidated portions as a single file system.

8 Claims, 4 Drawing Sheets

STORAGE SYSTEM AND METHOD

RELATED APPLICATIONS

This patent application claims priority to Indian patent application serial no. 743/CHE/2007, titled "Storage System and Method", filed on 9 Apr. 2007 in India, commonly assigned herewith, and hereby incorporated by reference.

BACKGROUND TO THE INVENTION

Within a network of data processing systems, each data processing system typically includes its own local storage unit that may comprise, for example, a hard disk. A data processing system may access data on a storage unit belonging to another data processing system using, for example, network file system (NFS) software. The network may also include a backup system comprising storage such that data on the storage units of the data processing systems can be backed up onto the storage of the backup system.

It is an object of embodiments of the invention to at least mitigate one or more of the problems of the prior art.

BRIEF DESCRIPTION OF THE DRAWINGS

Embodiments of the invention will now be described by way of example only, with reference to the accompanying drawings, in which.

SUMMARY OF THE INVENTION

One embodiment is a storage system that comprises apparatus for consolidating portions of free space from a plurality of remote storage units, and apparatus for presenting the consolidated portions as a single file system.

Another embodiment is a storage method that comprises consolidating portions of free space from a plurality of remote storage units, and storing data within the consolidated portions as a single file system.

A further embodiment is a data processing system that comprises a storage unit, apparatus for indicating free space available on the storage unit, and apparatus for storing data associated with a remote file system within the free space.

DETAILED DESCRIPTION OF EMBODIMENTS OF THE INVENTION

The storage units within individual data processing systems on a network are typically over-provisioned such that they contain more capacity than is required by the data processing system. Embodiments of the invention provide a storage system and method whereby free space on the storage units of individual data processing systems is consolidated and offered as a single file system for storing data, such as backup data. This improves the usage of the individual storage units, and a network of data processing systems that includes a storage system according to embodiments of the invention may not require a backup system for backing up data. Instead, the data to be backed up can be stored on the file system.

Figure 1:
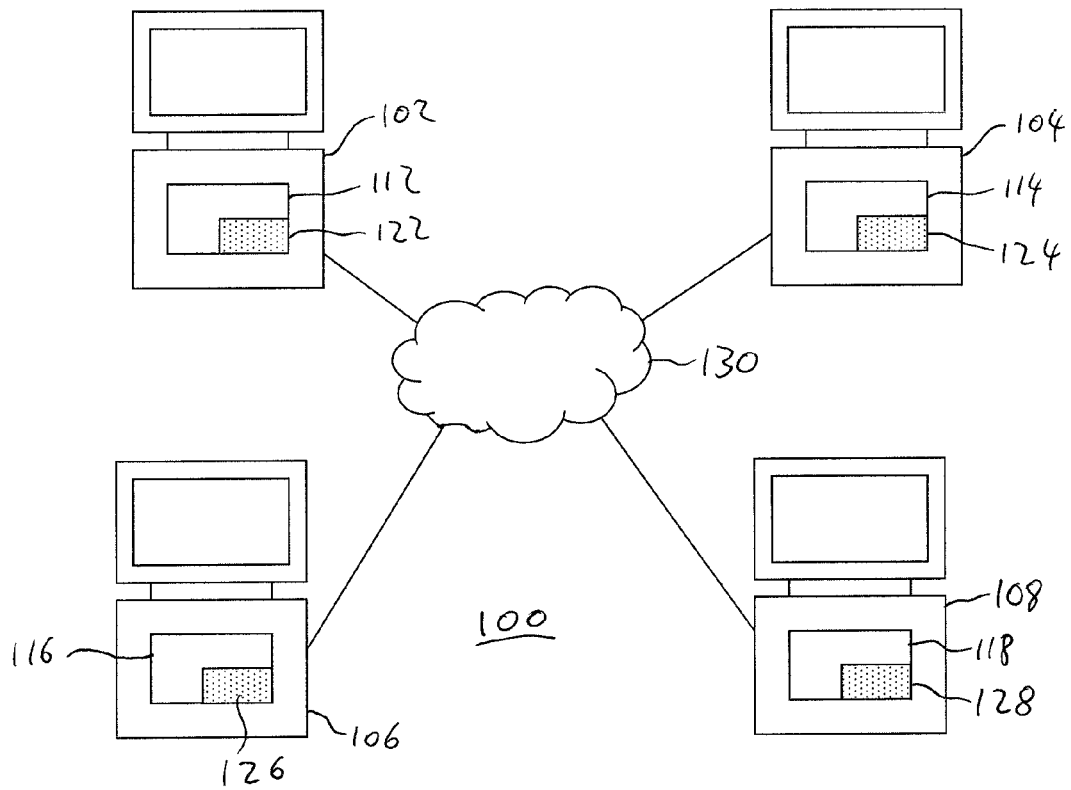
FIG. 1 shows an example of a network of data processing systems.

FIG. 1 shows a network 100 that includes four data processing systems 102, 104, 106 and 108. The data processing systems include storage units 112, 114, 116 and 118 respectively. The storage units 112, 114, 116 and 118 include portions of free space 122, 124, 126 and 128 respectively. The portions of free space 122, 124, 126 and 128 are made available by the corresponding data processing systems over a network 130. The network 130 may be a wired and/or wires network such as, for example, a LAN, WAN and/or internet network. In other embodiments of the invention, there may be two or more data processing systems, and each data processing system may include one or more storage units, whereby each storage unit includes a portion of free space that is accessible over the network. In embodiments of the invention, the portions of free space on the storage units may be made available for use within the file system by, for example, a network administrator and/or software for making the portions of free space available.

One of the data processing systems acts as a storage system provider. For example, the data processing system 102 acts as a storage system provider. The storage system provider consolidates the portions of free space on one or more data processing systems and presents the consolidated portions as a single virtual file system. For example, the iSCSI protocol can be used on the data processing systems on the network to provide the portions of free space to the storage system provider. The storage system provider may, for example, use an iSCSI initiator to discover the presence of the portions of free space and connect to the appropriate storage units. The storage system provider may make the virtual file system available to other data processing systems on the network using, for example, Network File System (NFS) or Common Internet File Sharing (CIFS), or some other method.

Figure 2:
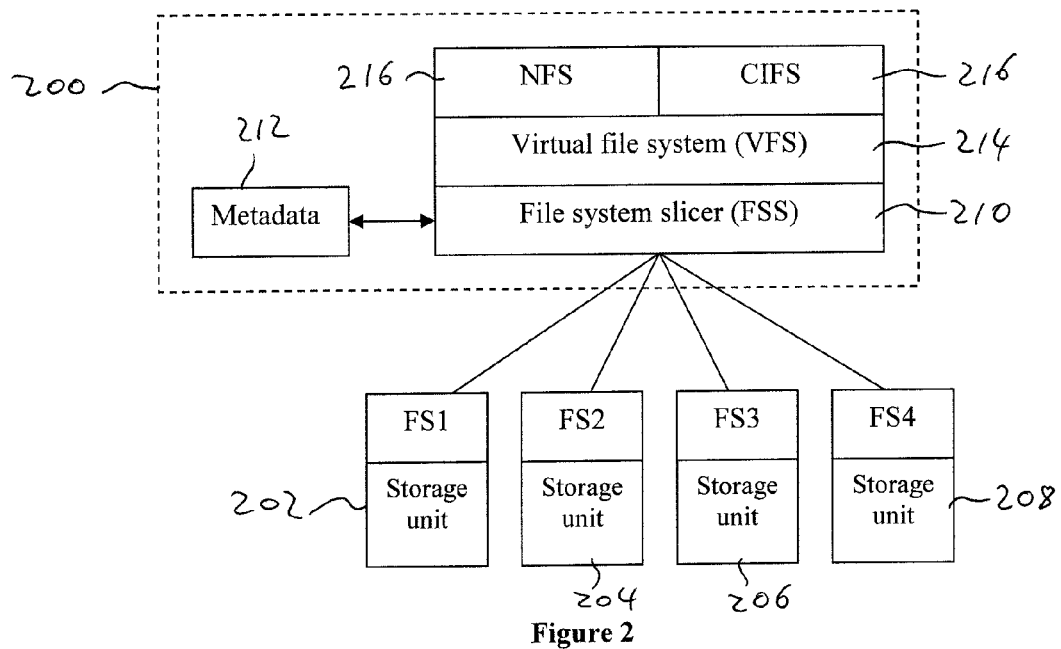
FIG. 2 shows an example of a storage system provider according to embodiments of the invention.

FIG. 2 shows an example of a storage system provider 200. The storage system provider 200 consolidates portions of free space from remote storage units. The storage system provider may also include a portion of free space from its local storage unit. For example, the storage system provider 200 may consolidate free space from remote SCSI storage units 202, 204, 206 and 208. The storage system provider 200 may communicate with the remote storage units using, for example, iSCSI. The storage system provider includes a file system slicer (FSS) 210 that handles the storage of files in the file system. For example, the file system slicer 210 sends files to be stored in the file system to one or more of the remote storage units. For example, the FSS 210 may split files to be stored in the file system into slices of a predetermined size, and sends the slices to the remote storage units for storage. A metadata file 212 stores information on the files stored within the file system and their locations (a file may have more than one location, i.e. more than one data storage unit, where it is split into multiple slices). Where a file or a slice of a file is stored on a storage unit, it is stored within the portion of free space that is provided by the corresponding data processing system to the storage system provider 200.

Each of the storage units 202, 204, 206 and 208 have a native file system. For example, the storage unit 202 has a file system FS1, the storage unit 204 has a file system FS2, the storage unit 206 has a file system FS3 and the storage unit 208 has a file system FS4. The file systems FS1, FS2, FS3 and FS4 may comprise, for example, one or more of NTFS, ext2/ext3 or other file systems. The file system slicer (FSS) 210 makes the file systems FS1-4 transparent to the rest of the storage system provider 200.

The storage system provider 200 also includes a virtual file system (VFS) layer 214 above the FSS layer 210. The VFS 214 makes the FSS 210 appear as a single virtual file system. The storage system provider also includes a file system sharing layer 216 above the VFS layer 214. The file system sharing layer 216, such as, for example, NFS or CIFS, shares the virtual file system presented by the VFS layer 214 with other data processing systems, for example those connected to the network 130 shown in FIG. 1.

Figure 3:
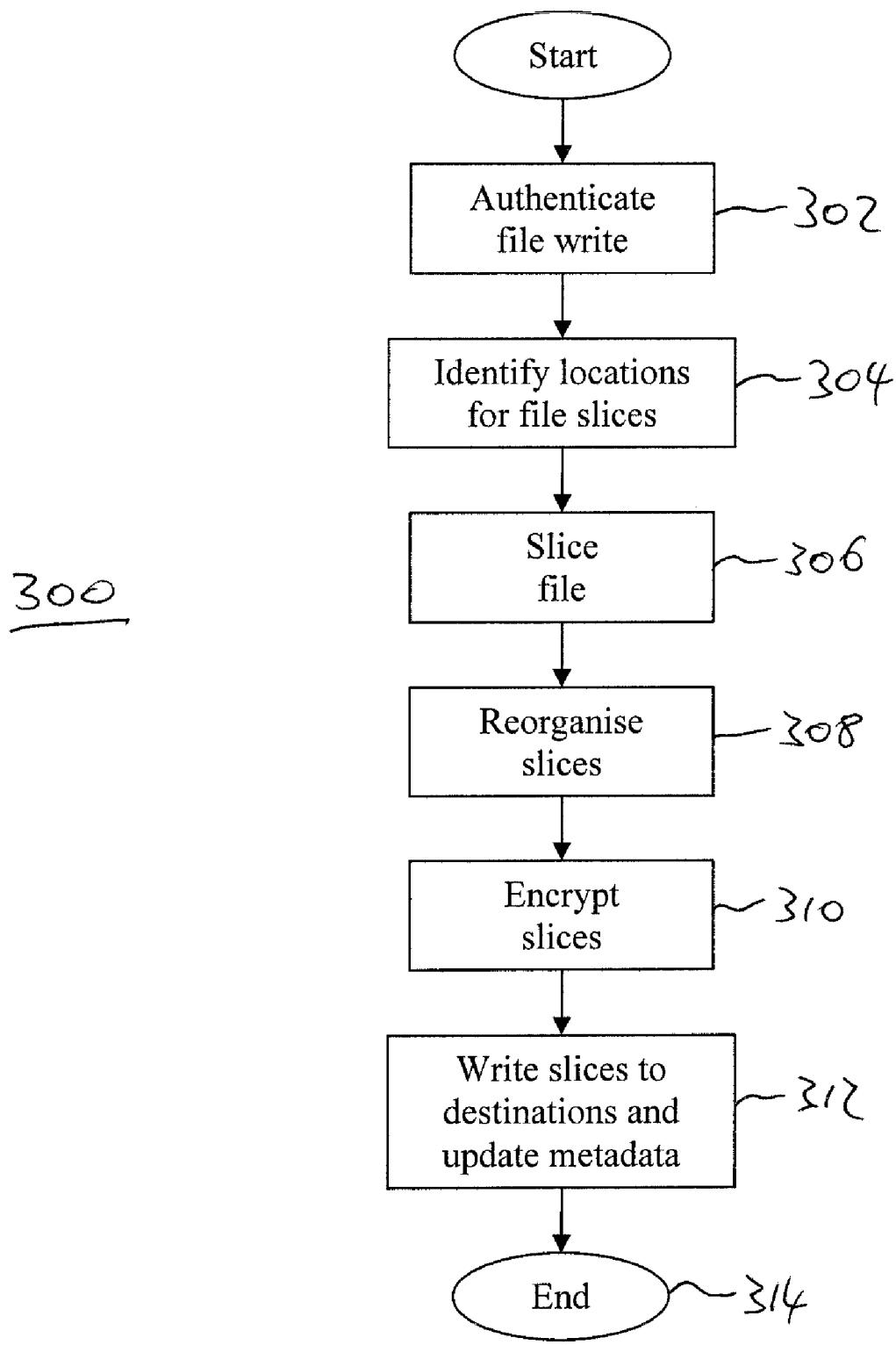
FIG. 3 shows an example of a method of storing a file on a file system according to embodiments of the invention.

FIG. 3 shows an example of a method of storing a file according to embodiments of the invention. A request to store a file is received by the storage system provider 200 from a data processing system, such as, for example, a remote data processing system or a data processing system on which the storage system provider 200 resides. The method 300 starts at step 302 where the storage system provider 200 authenticates the request to store a file. This is done, for example, by checking that the data processing system that made the request has permission to store files on the file system. Permissions may be stored, for example, within the metadata 212 and/or elsewhere. If the data processing system does not have permission, then the file is not stored and the method 300 ends. If the data processing system has permission then the method continues to step 304 where locations for file slices are identified.

The FSS 210 shown in FIG. 2 slices the file to be stored into multiple slices. For example, the slices may be of equal size, although the slices may vary in size in alternative embodiments. For example, the FSS 210 slices the file to be stored into equal 4 Kbyte slices. If the size of the file is not a multiple of 4 Kbytes, then the FSS 210 may add padding to the file to increase its size to a multiple of 4 Kbytes.

Each slice is stored in multiple locations. That is, each slice is stored in multiple portions of free space made available to the file system. In embodiments of the invention, each slice is stored in at least two locations. A slice may be stored at one location, and a copy of the slice may be stored at one or more other locations. The locations for the slices may be chosen based on the following criteria:
(1) The source of the file to be stored on the file system.
(2) The available storage space within the portions of free space made available to the file system.
(3) No single point of failure.
(4) Location preference of the data processing system making the request to store the file.
(5) Reliability of the storage units at the locations.
(6) Lease time available at the locations.

For example, considering (1) above, a location (that is, a portion of free space on a storage unit) to store a slice may be chosen such that a storage unit associated with the data processing system that is the source of the request to store the file is not chosen. In alternative embodiments, this may only be the case where the data processing system making the request is backing up its data. Therefore, if the data processing system making the request and/or its storage unit subsequently fails or is removed from the network or file system, each of the slices of the stored file is still stored in multiple locations.

For example, considering (2) above, a storage unit may only be chosen where the portion of free space made available to the file system still has room to store the slice.

For example, considering (3) above, a slice should be stored in multiple different locations, and a slice should not be stored multiple times at a single location. Therefore, if a storage unit fails or is removed from the network or file system, there is still a copy of each slice on that storage unit stored at another location.

For example, considering (4) above, the data processing system making the request to store the file may have a preference for the locations to store the slices of the file. For example, a data processing system may have a preferred list of storage locations based on IP address or iSCSI qualified name (IQN). A data processing system may indicate preferred storage locations when, for example, the locations are close to the data processing system and/or it is expected that the data processing system and the location will be available at similar times.

For example, considering (5) above, a storage location may be unreliable in that it may be unavailable more frequently than other locations. For example, the data processing system associated with the storage unit at that storage location may be a mobile device that may or may not be available to the network and/or the storage system provider. On the other hand, a server attached to the network and including one or more storage units may have a high availability. The locations may be chosen such that more reliable locations, for example locations that are more likely to be available, are preferred.

For example, considering (6) above, a data processing system may specify that the portion of free space on its storage unit may only be available for use in the file system by the storage system provider 200 for a limited time, the lease time. Therefore, locations may be chosen based on the remaining lease time for the locations. For example, locations with a longer lease time may be preferred over locations with a shorter lease time. Once the lease time for a storage location has expired, the storage system provider 200 may copy the files stored at that location to one or more other locations.

Figure 4:
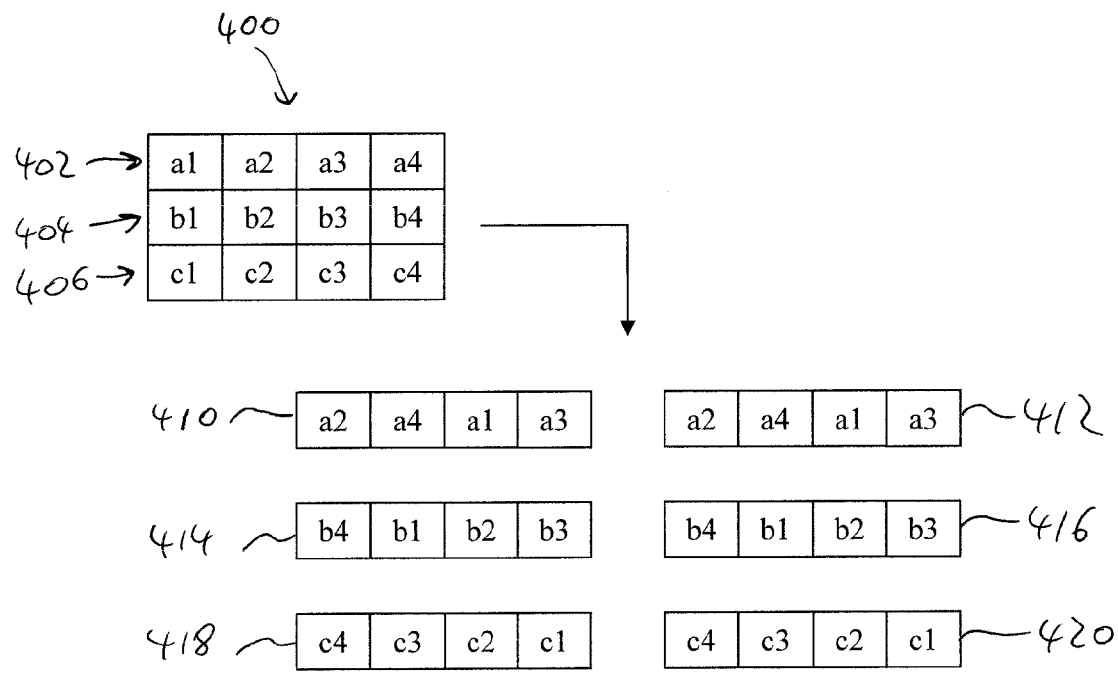
FIG. 4 shows an example of reorganising a file.

Once locations are determined in step 304 of the method 300, the file is sliced into slices in step 306 and reorganised, or scrambled, in step 308. FIG. 4 shows an example of a 12 Kbyte file 400 that is sliced into three slices 402, 404 and 406. The first slice 402 comprises four 1 Kbyte blocks a1, a2, a3, a4. The second slice 404 comprises four 1 Kbyte blocks b1, b2, b3, b4. The third slice 406 comprises four 1 Kbyte blocks c1, c2, c3, c4. The FSS 210 scrambles the slices by, for example, reordering the 1 Kbyte blocks into a different order, for example a random order, such that the slice is prevented or inconvenienced from being interpreted in isolation, such as, for example, by a data processing system associated with the storage unit on which the file is stored. For example, the slice 402 is reordered as a2, a4, a1, a3 as slice 410 and a copy 412 of the slice 410. The slice 404 is reordered as b4, b1, b2, b3 as slice 414 and a copy 416 of the slice 414. The slice 406 is reordered as c4, c3, c2, c1 as slice 418 and a copy 420 of the slice 418. The slices 410-420 may be stored at the same location or different locations, except that a slice cannot be stored in the same location as its copy according to criterion (3) above. In alternative embodiments, other sizes for the slices and blocks (including variable sizes) can be used.

Referring back to FIG. 3, once the slices have been reorganised in step 308, the slices are encrypted in step 310. This further prevents or inconveniences the slice from being interpreted in isolation. Then, in step 312, the slices are stored in their chosen locations and the metadata file 212 is updated. The metadata file is updated with sufficient information to allow any of the copies of the slices to be retrieved and the stored file to be reconstructed. For example, the metadata may indicate, for a stored file, the locations of the slices, the order of the blocks within the slices and decryption keys (if required) to decrypt the slices. Once the metadata file has been updated in step 312, the method 300 ends at step 314. In embodiments of the invention, the same encryption key may be used to encrypt the slices. In other embodiments, different slices may be encrypted using different encryption keys. For example, a slice may be encrypted using an encryption key that depends on the storage location of that slice.

In certain embodiments of the invention, identical slices (i.e. a slice and a copy of a slice) are written to the chosen locations such that at least two of the slices are written synchronously to the storage units at those destinations. This will ensure that at least two such slices are stored at the locations. Further copies of the slice, if any, can be written asynchronously to other locations.

In alternative embodiments of the invention, security features, such as reorganising and/or encrypting slices, may be omitted where security is not an issue or is implemented using other means.

Figure 5:
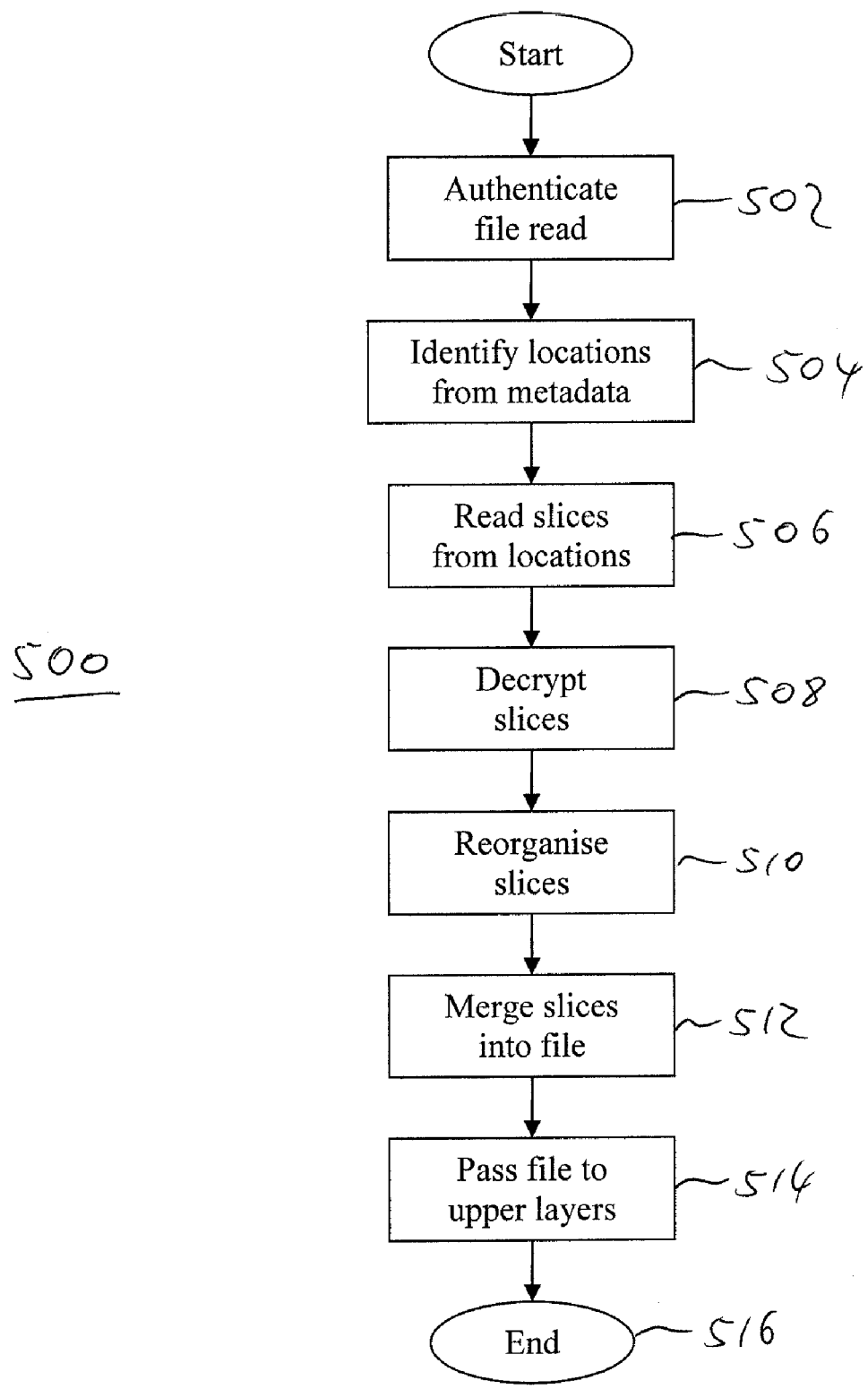
FIG. 5 shows an example of a method of reading a file from a file system according to embodiments of the invention.

FIG. 5 shows an example of a method 500 for reading a file from the file system. The storage system provider 200 receives a request to read a file stored in the file system. The method 500 starts at step 502 where the storage system provider 502 authenticates the file read, i.e. checks that the data processing system making the request to read the file has permission to read the file. The permissions may be located, for example, within the metadata file 212 and/or elsewhere. Next, in step 504, the metadata file 212 is consulted to determine locations of at least one copy of each of the slices of the file. Then, in step 506, the slices are read from the locations identified in step 506 to obtain at least one copy of all of the slices of the file. In step 508, which follows from step 506, the slices are decrypted, and the slices are then reorganised in step 510 into their original order using order information stored within the metadata file 212. Next, in step 512, the decrypted and reorganised files are merged into a single file, which is identical to the original file passed to the storage system provider 200 for storage. Once the file has been merged, the file is passed to upper layers in step 514. For example, the file is passed to the VFS layer 214 and/or file sharing layer 216 for providing the file to the data processing system that made the request to read the file. The method then ends at step 516.

The storage system provider 200 may monitor the data processing systems and/or the storage units providing the free space such that when one of the storage units no longer provides a portion of free space (for example, if a data processing system leaves the network or fails, if a storage unit fails or is removed, if a data processing system chooses to no longer provide a portion of free space or if the network fails), the storage system provider 200 retrieves copies of the slices stored on the storage unit from other storage units and chooses new locations for copies of these slices. Therefore, the storage system provider 200 maintains at least two copies of each of the slices for all of the files within the file system. The metadata file 212 can be consulted and updated as appropriate.

The metadata file 212 may be stored locally on a data processing system that is implementing the storage system provider 200. Additionally or alternatively, the metadata file may be stored in a location away from the storage system provider 200.

The storage system provider 200 may allow for other file operations to be performed on the files within the file system such as, for example, copy, delete and/or other operations.

Figure 6:
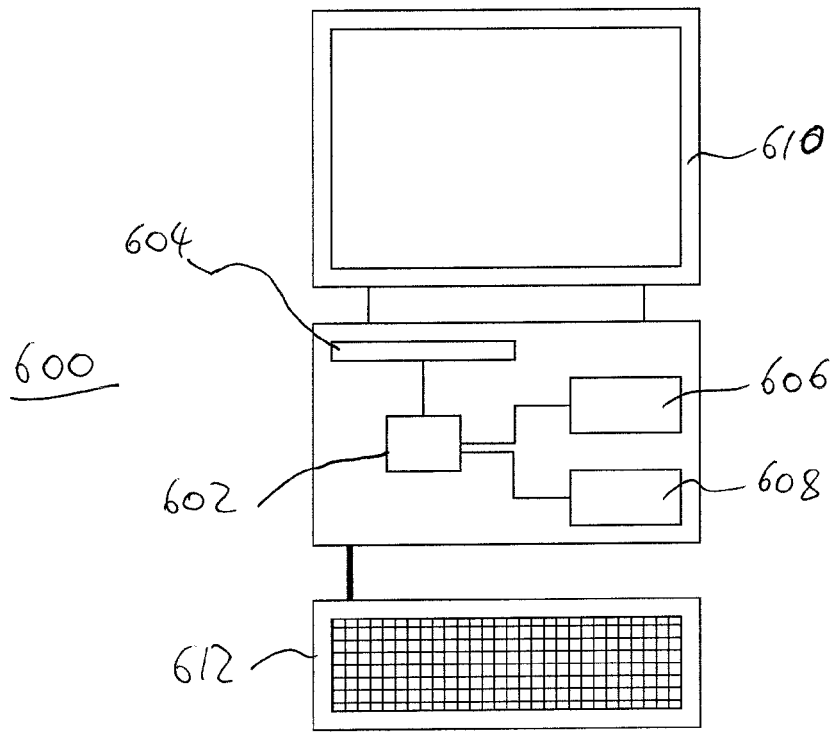
FIG. 6 shows an example of a data processing system.

FIG. 6 shows an example of a data processing system 600. The data processing system includes at least one data processor 602, main memory (such as, for example, RAM) 604, a storage unit 606 and a communications device 608 for communicating with an external wired and/or wireless network such as, for example, a LAN, WAN and/or internet. The data processing system 600 may also include a display device 610 and/or an input device such as, for example, a mouse and/or keyboard.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A storage system comprising:
    apparatus for consolidating portions of free space from a plurality of remote storage units, wherein the remote storage units are accessed over a network;
    apparatus for presenting the consolidated portions as a single file system;
    apparatus for discovering the portions of free space on the network; and
    a metadata file for indicating files that are stored in the file system and their locations within the portions of free space.

2. A system as claimed in claim 1, wherein files stored in the file system are replicated across multiple portions of free space.

3. A storage system comprising:
    apparatus for consolidating portions of free space from a plurality of remote storage units; and
    apparatus for presenting the consolidated portions as a single file system,
    wherein data provided to the storage system from a first remote storage unit is stored in portions of free space from remote storage units other than the first remote storage unit, and
    wherein files stored in the file system are encrypted.

4. A storage system comprising:
  apparatus for consolidating portions of free space from a plurality of remote storage units;
  apparatus for presenting the consolidated portions as a single file system, wherein files stored in the file system are replicated across multiple portions of free space; and
  apparatus for producing a new replica of data stored in an unavailable remote storage unit by accessing replicas of the data in other remote storage units.

5. A storage method comprising:
  consolidating portions of free space from a plurality of remote storage units, wherein consolidating the portions of free space comprises accessing the remote storage units over a network;
  storing data within the consolidated portions as a single file system;
  discovering the portions of free space on the network; and
  maintaining a metadata file for indicating files that are stored in the file system and their locations within the portions of free space.

6. A method as claimed in claim 5, comprising replicating the data across multiple portions of free space.

7. A storage method comprising:
  consolidating portions of free space from a plurality of remote storage units;
  storing data within the consolidated portions as a single file system, wherein storing the data comprises storing the data provided to the storage system from a first remote storage unit in portions of free space from remote storage units other than the first remote storage unit; and
  encrypting the data.

8. A storage method comprising:
  consolidating portions of free space from a plurality of remote storage units; and
  storing data within the consolidated portions as a single file system;
  replicating the data across multiple portions of free space; and
  producing a new replica of data stored in an unavailable remote storage unit by accessing replicas of the data in other remote storage units.

* * * * *